March 15, 1949.  J. U. WHITE ET AL  2,464,738
METHOD OF MAKING OPTICAL ELEMENTS
Filed July 8, 1947

INVENTORS
John U. White
BY Walter A. Fraser
Pennie Edmonds Morton Barrows
ATTORNEYS Patented Mar. 15, 1949

2,464,738

UNITED STATES PATENT OFFICE 2,464,738

METHOD OF MAKING OPTICAL ELEMENTS

John U. White, Darien, and Walter A. Fraser, New Canaan, Conn., assignors to The Perkin-Elmer Corporation, Glenbrook, Conn., a corporation of New York Application July 8, 1947, Serial No. 759,574

6 Claims. (Cl. 18—59)

This invention relates to the manufacture of optical elements, such as diffraction gratings, lenses with aspheric surfaces, parabolic reflectors, etc., and is concerned more particularly with a novel method, by which reproductions of such elements may be made at low cost and by relatively simple operations, which can be performed without the use of elaborate equipment. In the practice of the invention, an imprint of the element is made and such an imprint is what is known in the industry as a replica. The imprint or replica is not an exact duplicate of the original, because of inversion, but, when such a duplicate is desired, it may be produced by making an imprint of the first imprint. Since the steps employed in producing a grating by the new method are typical, that form of the method will be illustrated and described in detail for purposes of explanation.

It has been proposed heretofore to reproduce diffraction gratings by pouring a liquid, such as a solution of Celluloid, over the grating, allowing the coating to set, and then immersing the coated grating in water to free the coating from the grating. The coating is then laid upon the flat surface of a glass plate and allowed to dry in that position. Gratings so made, however, are unsatisfactory, in that the diffracting surface is usually distorted, either because of variations in the thickness of the coating or because of uneven shrinkage in drying. Also the coating is delicate and easily damaged.

In the reproduction of gratings by the method of the invention, the difficulties mentioned are overcome and gratings of excellent accuracy are easily obtained. In the practice of the method, a thin film of a parting material of low vapor pressure is applied to the ruled face of the master grating, after which an impervious coating of a protective material is applied over the film. A body of fluent material, which is capable of being treated to convert it to rigid form, is then confined in contact with the coating. A rigid base is then placed in contact with the body to cover the latter and the assembly is treated to cause solidification of the body. When this action is completed, the assembly of base, body, and protective coating is separated from the grating at the film of parting material and traces of the parting material are removed from the exposed face of the coating. The imprint or replica grating is then completed and ready for use.

For a better understanding of the invention, reference may be had to the accompanying drawing, in which Fig. 1 is a sectional view, on an enlarged scale, of a diffraction grating transverse to the ruled lines of the grating.

Figure 1:
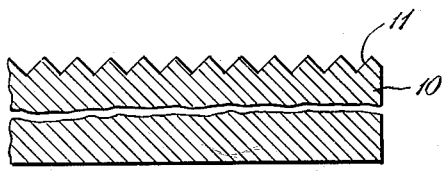
Figure 2:
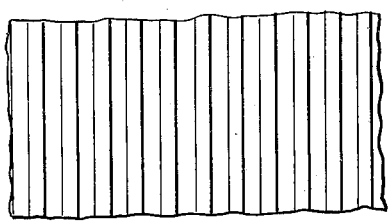
Fig. 2 is a plan view on an enlarged scale of the ruled surface of the grating.
Figure 4:
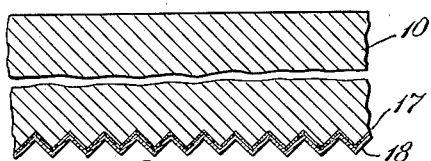
Fig. 4 is an enlarged transverse sectional view through the grating of Fig. 1 at one stage in the practice of the method.

In the practice of the new method for the reproduction of a diffraction grating, the master grating 10 may be of any conventional type and may be a thick copper block which has been ruled with closely spaced parallel lines 11 and has a thin plating of nickel on its ruled face. In carrying out the new method, the first step is the application to the thoroughly clean ruled surface of the grating of a film of a parting material. The film should be extremely thin as, for example, about $\frac{1}{10}$ of a wave length of light thick, and it should be of uniform thickness.

The parting material should have a relatively low vapor pressure, as, for example, less than $10^{-4}$ or $10^{-5}$ mm, at room temperature, and various parting materials may be used, such as mannitol, glycerin, carnauba wax, and butyl phthalate. The most satisfactory parting materials are solids at ambient temperatures and are immiscible with the solidifiable material, of which the imprint is made. Mannitol is preferred. The application of a film of the parting material of the desired thickness and uniformity may best be carried on in an evaporating apparatus comprising a closed vessel 12, in which the grating 10 may be mounted on supports 13 with its ruled surface exposed. A heating coil 14 is mounted within the vessel and supplied with current from a transformer, generally indicated at 15. The vessel is connected through a pipe 16 with a vacuum pump, by which the interior of the vessel may be evacuated to a high degree of vacuum.

An impervious coating of a protective material is applied over the parting material and the protective coating may be made of a suitable metal, such as aluminum, or it may be a transparent material, such as magnesium fluoride, silica, etc. The coating may also be applied by evaporation and, to apply the layers of parting material and protective coating material, the grating is placed on the supports within the evaporator and a drop of the parting material and a small piece of the protective material are placed on coil 14. After evacuation of the evaporator, current is supplied to the heating coil and the parting material is first evaporated and coats the ruled surface of the grating with a thin layer or film. Thereafter, the temperature of the coil is increased and the protective material is evaporated over the film or layer of parting material, making a composite film on the grating.

Figure 5:
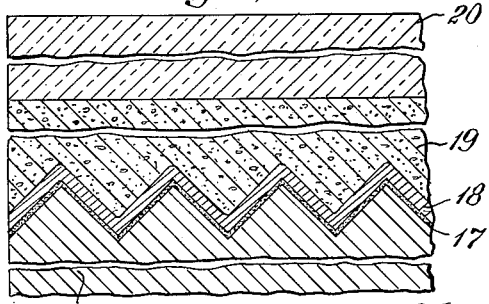
Fig. 5 is a transverse sectional view on an enlarged scale through the grating of Fig. 4 at a subsequent stage in the practice of the method.
Figure 3:
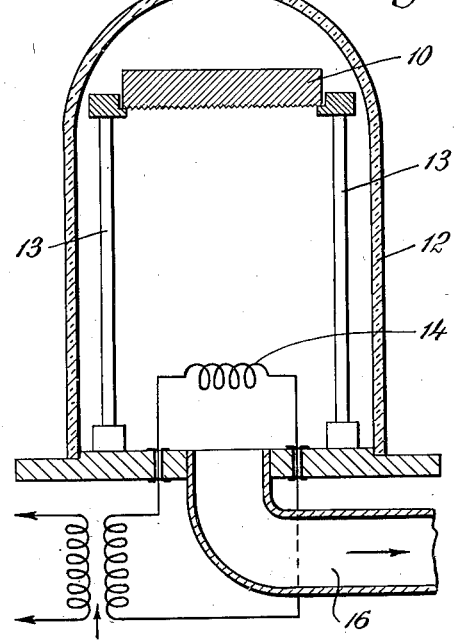
Fig. 3 is a vertical sectional view through an evaporating apparatus, which may be used in the practice of the method of the invention.
Figure 6:
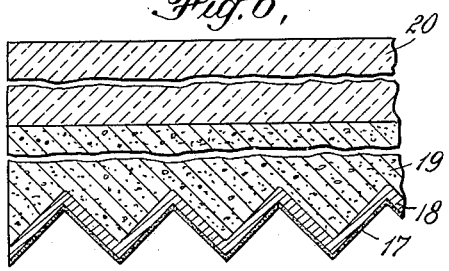
Fig. 6 is a view similar to Fig. 5 showing the duplicate separated from the master grating.
Figure 7:
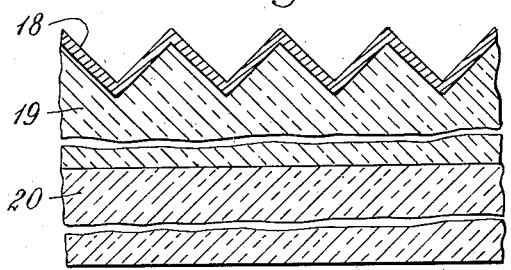
Fig. 7 is a view similar to Fig. 6 showing the completed duplicate.

When the operations of applying the composite film have been completed, the grating is removed from the evaporator and placed on a suitable support with its ruled surface uppermost. At this time, the ruled surface of the grating is covered with a thin layer 17 of the parting material and a thicker coating or layer 18 of the protective material, as illustrated in Fig. 5 on a greatly enlarged scale. The layers of parting material and protective material are individually of substantially uniform thickness, so that the lines are apparent in the coated surface of the grating and the ridges and depressions formed by the ruling appear substantially without change in the outer surface of the coating 18.

In the next step in the process, a body 19 of a solidifiable material in fluent form is confined on top of the coating layer 18. The material used for this purpose must be one, which neither affects nor is affected by the protective material and is capable of conversion to a stable rigid form. Various kinds of polymerizable resins are suitable for the purpose and one such resin is that known commercially as "Laminac," which is a di-allyl ester of diethylene glycol dicarbonate and includes a catalyst. Other allyl thermosetting resins well known in the art also may be used. The resins preferred are those capable of being polymerized by ultra-violet light or heat.

After application of the solidifiable material to the coated surface of the master, a base 20 of rigid material is laid on top of the body. The base preferably used is a plate of glass having a surface which corresponds to that of the ruled surface of the grating and is either flat or of slight curvature. The plate is placed with that surface in contact with the body 19. The material used for the body must be one which is capable of adhering to the base, and the two resins mentioned will adhere to glass.

The assembly of the coated grating, body, and base is then treated to cause the body to solidify and, when the resins are used, they may be polymerized by exposing the assembly to ultraviolet rays from a high intensity source, such as a mercury arc. After the polymerization is completed, the assembly of base, body, and protective coating are separated from the master grating at the parting layer 17. For this purpose, the edge of a razor blade is inserted between the coating and the master grating at the film and the grating and assembly are pried apart. Separation of the reproduction from the master grating can also be achieved, when the assembly is still warm, by holding the master grating uppermost and tapping the edge of the base, thus causing the reproduction to drop away from the master. This method is preferred for small or concave reproductions. Traces of the parting material are then removed from the surface of the metal coating 18 and the reproduction grating is then completed.

The reproduction grating described is a reflection grating having an aluminized surface 18. If desired, the metal coating may be readily removed by alkali, so that the grating will be of the transmission type. When it is desired to produce a transmission grating directly, the protective coating may be made of a transparent material, such as magnesium fluoride or silica, which remains in place on the finished grating.

We claim:

1. A method of making an imprint of an optical element, which comprises applying a thin film of a parting material of relatively low vapor pressure to the surface of the element, applying an impervious coating over the film, confining a body of fluent material, which is solidifiable to rigid form, on top of the coating, placing a rigid base in contact with the body to cover the latter, the coating and body being unaffected by one another and the solidifiable material being capable of adhering to the base, treating the solidifiable material to cause it to solidify, and thereafter separating the assembly of base, body, and coating from the element at the film.

2. A method of making an imprint of an optical element, which comprises applying a thin film of a parting material of relatively low vapor pressure to the surface of the element, applying an impervious coating over the film, confining a body of fluent material, which is polymerizable to rigid form, on top of the coating, placing a rigid base in contact with the body to cover the latter, the coating neither affecting nor being affected by the parting and polymerizable materials and the polymerizable material being capable of adhering to the base, treating the polymerizable material to polymerize it, and thereafter separating the assembly of the base, body, and coating from the element at the film.

3. A method of making an imprint of an optical element, which comprises applying a thin film of a parting material of relatively low vapor pressure to the surface of the element, applying an impervious coating of metal over the film, confining a body of fluent material, which is polymerizable to rigid form, on top of the coating, placing a rigid base in contact with the body to cover the latter, the metal neither affecting nor being affected by the parting and polymerizable materials and the polymerizable material being capable of adhering to the base, treating the polymerizable material to polymerize it, and thereafter separating the assembly of the base, body, and coating from the element at the film.

4. A method of making an imprint of an optical element, which comprises applying to the surface of the element a thin film of a parting material of relatively low vapor pressure, applying a thin impervious coating of metal over the film, the material in the film being unaffected by the metal at elevated temperatures, confining a body of fluent material, which is capable of being polymerized to solid form, on top of the coating, placing a base against the body, the polymerizable material being capable of adhering to the base, treating the polymerizable material to polymerize it, and thereafter separating the assembly of the base, body, and coating from the element at the film.

5. A method of making an imprint of an optical element, which comprises applying a thin film of a parting material of relatively low vapor pressure to the surface of the element by evaporation, applying a thin impervious coating of a protective material over the film by evaporation, confining a body of fluent material, which is polymerizable to rigid form, on top of the coating, placing a rigid base in contact with the body to cover the latter, the protective material neither affecting nor being affected by the parting and polymerizable materials and the polymerizable material being capable of adhering to the base, treating the polymerizable material to polymerize it, and thereafter separating the assembly of the base, body, and coating from the element at the film.

6. A method of making an imprint of a diffraction grating, which comprises applying a thin film of a parting material of low vapor pressure to the ruled surface of the grating, applying a thin coating of a protective material over the film, the film and coating being unaffected by one another and each being of substantially uniform thickness so that the exposed layer of the coating has depressions corresponding to the lines of the grating, confining a body of solidifiable material in fluent form over the coating, placing a base on top of the body, the solidifiable material being capable of adhering to the base, treating the body to solidify it, and separating the assembly of the base, body, and coating from the grating at the film.

JOHN U. WHITE.
WALTER A. FRASER.

REFERENCES CITED

The following references are of record in the file of this patent:

UNITED STATES PATENTS

| Number | Name | Date |
|---|---|---|
| 283,560 | Blohm | Aug. 21, 1883 |
| 1,834,763 | Bonsieur | Dec. 1, 1931 |

FOREIGN PATENTS

| Number | Country | Date |
|---|---|---|
| 271,192 | Great Britain | May 26, 1927 |
| 501,606 | Great Britain | Mar. 2, 1939 |